US011106900B2

(12) United States Patent
Taniguchi

(10) Patent No.: US 11,106,900 B2
(45) Date of Patent: Aug. 31, 2021

(54) PERSON TREND RECORDING DEVICE, PERSON TREND RECORDING METHOD, AND PROGRAM

(71) Applicant: Omron Corporation, Kyoto (JP)

(72) Inventor: Haruka Taniguchi, Tokyo (JP)

(73) Assignee: Omron Corporation, Kyoto (JP)

( * ) Notice: Subject to any disclaimer, the term of this patent is extended or adjusted under 35 U.S.C. 154(b) by 109 days.

(21) Appl. No.: 16/461,912

(22) PCT Filed: Nov. 28, 2017

(86) PCT No.: PCT/JP2017/042505
§ 371 (c)(1),
(2) Date: May 17, 2019

(87) PCT Pub. No.: WO2018/168095
PCT Pub. Date: Sep. 20, 2018

(65) Prior Publication Data
US 2019/0332855 A1    Oct. 31, 2019

(30) Foreign Application Priority Data
Mar. 14, 2017   (JP) .............................. JP2017-048828

(51) Int. Cl.
*G06K 9/00*   (2006.01)
*G06Q 30/02*   (2012.01)
*G06T 7/20*   (2017.01)

(52) U.S. Cl.
CPC ......... *G06K 9/00335* (2013.01); *G06Q 30/02* (2013.01); *G06T 7/20* (2013.01)

(58) Field of Classification Search
CPC .. H04N 7/18; G06K 9/00597; G06K 9/00335; G06K 9/00268; G06K 9/00892; G06Q 30/02; G06T 7/20
See application file for complete search history.

(56) References Cited

U.S. PATENT DOCUMENTS

2007/0270664 A1* 11/2007 Ishii ........................ G16H 50/20
                                                                600/300
2010/0205541 A1*  8/2010 Rapaport .............. G06F 16/285
                                                                715/753
(Continued)

FOREIGN PATENT DOCUMENTS

JP         2006-127057 A    5/2006
JP         2009-37459 A     2/2009
(Continued)

OTHER PUBLICATIONS

International Search Report issued in Application No. PCT/JP2017/042505, dated Feb. 20, 2018 (2 pages).
(Continued)

*Primary Examiner* — Syed Haider
(74) *Attorney, Agent, or Firm* — Osha Bergman Watanabe & Burton LLP

(57) ABSTRACT

A person trend recording device includes: an image acquisition unit configured to acquire moving image data obtained by capturing an image of a target area; a person detector configured to detect and track a person, who acts within the target area, by analyzing the moving image data; an event detector configured to detect an event that occurs with the person during a period of tracking the person, by analyzing the moving image data; a physio-psychological index detector configured to detect a temporal change in a physio-psychological index of the person during the tracking period, by analyzing the moving image data; and a trend record generator configured to generate, as trend record data on the person, data in which at least one or more events that occur with the person are temporally associated with the temporal change in the physio-psychological index of the person.

15 Claims, 12 Drawing Sheets

(56) References Cited

U.S. PATENT DOCUMENTS

| | | | |
|---|---|---|---|
| 2011/0301433 A1 | 12/2011 | Sadowsky et al. | |
| 2014/0222479 A1* | 8/2014 | Hirakawa | G06Q 10/063114 |
| | | | 705/7.15 |
| 2016/0170998 A1* | 6/2016 | Frank | H04W 4/021 |
| | | | 707/748 |
| 2017/0277500 A1* | 9/2017 | Ono | G06F 3/1446 |

FOREIGN PATENT DOCUMENTS

| | | | |
|---|---|---|---|
| JP | 2013-537435 A | 10/2013 | |
| JP | 2014-149685 A | 8/2014 | |
| JP | 2016-103786 A | 6/2016 | |

OTHER PUBLICATIONS

Written Opinion issued in International Application No. PCT/JP2017/042505, dated Feb. 20, 2018 (10 pages).

* cited by examiner

Fig. 6

| Time | Position | Facial expression | Smile level | Pulse rate | Blinking frequency | Gaze level | Event | Satisfaction level | Interest level |
|---|---|---|---|---|---|---|---|---|---|
| 10:30 | 15,100 | Serious | 10 | 55 | 42 | 20 | Enter store | 60% | 60% |
| 10:31 | 15,10 | Pleased | 60 | 67 | 62 | 85 | Look at product A | 90% | 70% |
| 10:32 | 28,35 | Pleased | 50 | 50 | 43 | 53 | None | 80% | 50% |
| : | : | : | : | : | : | : | : | : | : |
| 10:40 | 50, 63 | Serious | 10 | 43 | 41 | 25 | Spoken to by clerk | 0% | 10% |
| 10:41 | 50, 66 | Disgusted | 0 | 48 | 40 | 13 | None | 40% | 0% |
| : | : | : | : | : | : | : | : | : | : |
| 10:50 | 90,36 | Serious | 10 | 42 | 41 | 45 | None | 0% | 0% |
| : | : | : | : | : | : | : | : | : | : |
| 10:55 | 20, 10 | Pleased | 65 | 63 | 65 | 68 | Pick up product A | 95% | 70% |
| 10:56 | 40,15 | Pleased | 70 | 70 | 66 | 95 | None | 90% | 90% |
| : | : | : | : | : | : | : | : | : | : |
| 11:00 | 75, 15 | Serious | 15 | 55 | 50 | 26 | | 60% | 20% |
| 11:01 | 110, 18 | Pleased | 45 | 55 | 43 | 45 | Purchase | 60% | 40% |
| 11:02 | 100, 100 | Pleased | 40 | 68 | 43 | 11 | Leave store | 40% | 10% |

Fig. 10

| Age | | 20s |
|---|---|---|
| Gender | | Female |
| Body type | | Thin |
| Entry | | 10:30 |
| Exit | | 11:00 |
| Stay time | | 00:30:00 |
| Facial expressions | Pleased | 60% |
| | Serious | 30% |
| | Disgusted | 5% |
| | Sad | 0% |
| | Surprised | 5% |
| Smile level | Average | 30% |
| | Maximum | 95% |
| Pulse rate | Average | 65bpm |
| | Maximum | 100bpm |
| | Minimum | 60bpm |
| | Fluctuation range | 40bpm |
| Blinking frequency | Average | 15 times/min |
| | Maximum | 20 times/min |
| | Minimum | 14 times/min |
| | Fluctuation range | 17 times/min |
| Gaze level | Average | 20% |
| | Maximum | 95% |
| Satisfaction level | Average | 45% |
| | Maximum | 90% |
| Interest level | Average | 50% |
| | Maximum | 95% |

Fig. 12

| | | Sub-area A | | Sub-area B | | Sub-area C | | Sub-area D | |
|---|---|---|---|---|---|---|---|---|---|
| | | Satisfaction level | Interest level | Satisfaction level | Interest level | Satisfaction level | Interest level | Satisfaction level | Interest level |
| Age | ~10 | 60% | 50% | ... | ... | ... | ... | ... | ... |
| | 10~20 | 30% | 30% | ... | ... | ... | ... | ... | ... |
| | 20~30 | 5% | 10% | ... | ... | ... | ... | ... | ... |
| | 30~40 | 0% | 5% | ... | ... | ... | ... | ... | ... |
| | 40~ | 5% | 10% | ... | ... | ... | ... | ... | ... |
| Gender | Male | 0% | 10% | ... | ... | ... | ... | ... | ... |
| | Female | 60% | 40% | ... | ... | ... | ... | ... | ... |
| Body type | Thin | 30% | 40% | ... | ... | ... | ... | ... | ... |
| | Normal | 5% | 10% | ... | ... | ... | ... | ... | ... |
| | Fat | 0% | 0% | ... | ... | ... | ... | ... | ... |
| Stay time | ~10min | 5% | 5% | ... | ... | ... | ... | ... | ... |
| | 10~20min | 60% | 70% | ... | ... | ... | ... | ... | ... |
| | 20~min | 30% | 40% | ... | ... | ... | ... | ... | ... |
| Event | Spoken to by clerk | 5% | 10% | ... | ... | ... | ... | ... | ... |
| | Bump into person | 0% | 0% | ... | ... | ... | ... | ... | ... |
| | People density is high | 5% | 20% | ... | ... | ... | ... | ... | ... |
| | Sell bargain products | 70% | 80% | ... | ... | ... | ... | ... | ... |

PERSON TREND RECORDING DEVICE, PERSON TREND RECORDING METHOD, AND PROGRAM

TECHNICAL FIELD

The present invention relates to a technique for recording and analyzing actions and psychological movements of a person.

BACKGROUND ART

At stores that provide services such as eating and drinking and product sales, it is extremely important for healthy store operations to constantly research the customer satisfaction level and interest degree and to accurately understand customer needs and problems of the stores. There are various factors that influence customer satisfaction and interest. Examples of the various factors include decoration and layout in the store, a timing of customer service, waiting time, contents of customer service, display of goods, crowding conditions in the store, and information on special sales. Moreover, depending on the preference and attributes (gender, age, etc.) of the individual, the type and magnitude of the influence factor may differ. Conventionally, questionnaires have generally been used as a method for researching such satisfaction and interest for each customer. However, with the questionnaire imposing a burden on a respondent, there has been a problem in which a response rate is low and efficient research is difficult. In addition, the questionnaire responses can be intentionally controlled by the respondent. Thus, there is no guarantee that objective research results have been obtained.

Further, Patent Document 1 proposes a system for automatically recording various waiting times generated in customer service for the purpose of improving the customer satisfaction level and efficiently operating a store. A specific mechanism is to detect events of a customer, such as entry to the store, seating, ordering, delivery, and checkout (leaving the store) from images of a camera installed in the store and information of a point of sales (POS) system, and automatically calculate a guidance waiting time, an order waiting time, and a delivery waiting time from the difference between the occurrence times of events. According to this system, although objective data can be collected without imposing a burden on the customer, research items are limited to the waiting time, and it is not possible to sufficiently evaluate the customer satisfaction and interest degree and the changes thereof.

PRIOR ART DOCUMENT

Patent Document

Patent Document 1: Japanese Unexamined Patent Publication No. 2014-149685

SUMMARY OF THE INVENTION

Problems to be Solved by the Invention

The present invention has been made in view of the above circumstances, and it is an object of the present invention to provide a technique for automatically collecting and recording data useful for objectively evaluating customer satisfaction and interest degree without imposing a burden on the customer.

Means for Solving the Problem

In order to achieve the above object, the present invention adopts a configuration to detect, by moving image analysis, an event that has occurred with a certain person and a temporal change in a physio-psychological index of the person, and record data in which the event and the temporal change are associated.

Specifically, a first aspect of the present invention provides a person trend recording device including: an image acquisition unit configured to acquire moving image data obtained by capturing an image of a target area; a person detector configured to detect and track a person, who acts within the target area, by analyzing the moving image data; an event detector configured to detect an event that occurs with the person during a period of tracking the person, by analyzing the moving image data; a physio-psychological index detector configured to detect a temporal change in a physio-psychological index of the person during the tracking period, by analyzing the moving image data; and a trend record generator configured to generate, as trend record data on the person, data in which at least one or more events that occur with the person are temporally associated with the temporal change in the physio-psychological index of the person.

With this configuration, trend record data is generated automatically in which an event having occurred with a certain person is temporally associated with a temporal change in a physio-psychological index of the person. The use of such trend record data makes it possible to objectively evaluate the customer satisfaction and interest degree from the tendency of the physio-psychological index. In addition, it becomes easy to estimate an event having exerted a good/bad influence on the customer satisfaction and the interest level from the relationship between the temporal change in the physio-psychological index and the occurrence time of the event. Furthermore, since any processing of person detection, event detection, and physio-psychological index detection is performed by moving image analysis, the trend record data can be automatically collected and recorded without imposing a physical burden or a psychological burden on the customer.

It is preferable that the person trend recording device further include a psychological state estimator configured to calculate a psychological state index in which a psychological state of the person is estimated based on the temporal change in the physio-psychological index, and the trend record data further contain a psychological state index calculated by the psychological state estimator. With this configuration, the index indicating the psychological state of the person and the temporal change thereof are automatically recorded, whereby very useful data can be obtained. At this time, it is preferable that the psychological state estimator combine a plurality of physio-psychological indices to calculate the psychological state index. This is because, by combining a plurality of physio-psychological indices, it is possible to expect improvement in estimation accuracy and reliability of the psychological state. Further, at this time, the plurality of physio-psychological indices may include a physio-psychological index consciously controllable by the person, and a physio-psychological unconsciously controllable by the person. By combining the physio-psychological index which is unconsciously controllable, it is possible to objectively and reliably calculate the psychological state of the person. Examples of the psychological state indices include a satisfaction level (also referred to as a sufficiency level) indicating the degree of satisfaction, an interest level (also referred to as the level of interest or a concentration level) indicating the degree of interest, and a comfort level (also referred to as comfort/discomfort level) indicating the degree of comfort/discomfort.

It is preferable that the person trend recording device further include a satisfaction level estimator configured to estimate a satisfaction level of the person based on the temporal change in the physio-psychological index, and the trend record data further contain information on the satisfaction level estimated by the satisfaction level estimator. The person trend recording device may further include an interest level estimator configured to estimate an interest level of the person for an object in the target area based on the temporal change in the physio-psychological index, and the trend record data may further contain information on the interest level estimated by the interest level estimator. With these configurations, temporal changes in the customer satisfaction and interest degree are also automatically recorded, whereby very useful data can be obtained.

It is preferable that the physio-psychological indices include at least one of facial expression, a smile level, a pulse rate per unit time, a number of blinks per unit time, and a gaze level. This is because the indices can be detected from moving images or still images with a certain degree of reliability. Further, the physio-psychological indices may include a pupil diameter, eye movement, a respiratory rate per unit time, a body temperature, sweating, blood flow, and blood pressure. It is more preferable to use a plurality of physio-psychological indices in combination.

It is preferable that the person trend recording device further include an attribute estimator configured to estimate an attribute of the person by analyzing the moving image data, and the trend record data further contain information on the attribute estimated by the attribute estimator. This enables the evaluation of the difference in tendency for each attribute (e.g., age, gender, body type, etc.) of the person.

It is preferable that the person trend recording device further include a trend analysis result display unit configured to display a trend analysis result based on the trend record data, and the trend analysis result include information indicating, on a temporal axis, one or more events that occur with the person during the period of tracking the person and the temporal change in physio-psychological index of the person. With such information display, it is possible to visualize the causal relationship between an action (event) of a certain person and a change in physio-psychological indices.

It is preferable that the person trend recording device further include a trend analysis result display unit configured to display a trend analysis result based on the trend record data, and the trend analysis result include information indicating the physio-psychological index and/or a statistical value of the satisfaction level, calculated from the trend record data on each of a plurality of persons. Moreover, it is preferable that the person trend recording device further include a trend analysis result display unit configured to display a trend analysis result based on the trend record data, and the trend analysis result include information indicating the physio-psychological index and/or a statistical value of the interest level, calculated from the trend record data on each of a plurality of persons.

It is preferable that a plurality of sub-areas be set in the target area, and the trend analysis result include information indicating the statistical value calculated for each sub-area. This enables the evaluation of the popularity (customer satisfaction and interest degree) for each sub-area.

It is preferable that the person trend recording device further include an attribute estimator configured to estimate an attribute of the person by analyzing the moving image data, the trend record data further contain information on the attribute estimated by the attribute estimator, and the trend analysis result include information indicating the statistical value calculated for each of the attributes. This enables the evaluation of the tendency of the satisfaction level and the interest level for each attribute.

It is preferable that the trend analysis result include information indicating the statistical value calculated for each type of event. This enables the evaluation of the causal relationship between the satisfaction level and the interest level for each type of event.

Note that the present invention can be regarded as a person trend recording device having at least some of the above configurations or functions. The present invention can also be regarded as a person trend recording method or a control method for a person trend recording device which includes at least some of the above processing, a program for causing a computer to execute these methods, or a computer-readable recording medium in which such a program is recorded in a non-temporary manner. Each of the above configurations and processing can be combined to constitute the present invention so long as there is no technical contradiction.

Effect of the Invention

According to the present invention, it is possible to automatically collect and record data useful for objectively evaluating customer satisfaction and interest degree without imposing a burden on the customer.

BRIEF DESCRIPTION OF THE DRAWINGS

FIG. 6 is an example of trend record data.
FIG. 10 is a display example of trend analysis results.
FIG. 12 is a display example of trend analysis results.

MODE FOR CARRYING OUT THE INVENTION

The present invention relates to a technique for automatically recording a trend (actions and psychological movements) of a person, and particularly relates to a technique for detecting, by moving image analysis, an event having occurred with the person and a temporal change in a physio-psychological index of the person, and temporally associating and recording the event and the temporal change. Such record data is useful for objectively evaluating the customer satisfaction and interest degree, and analyzing factors having influenced the customer satisfaction and interest. The technique according to the present invention can be preferably applied to, for example, a system that performs customer analysis, customer satisfaction level survey, marketing research, problem detection, and the like, in a store or place that provides services to customers.

Hereinafter, a description will be given of a preferred embodiment in a case where the present invention is applied to a system for recording customer trends at a clothing store in a shopping mall. However, the configurations and operations of the devices described in the following embodiments are merely examples, and the scope of the present invention is not limited thereto.

(System Configuration)

Figure 1:
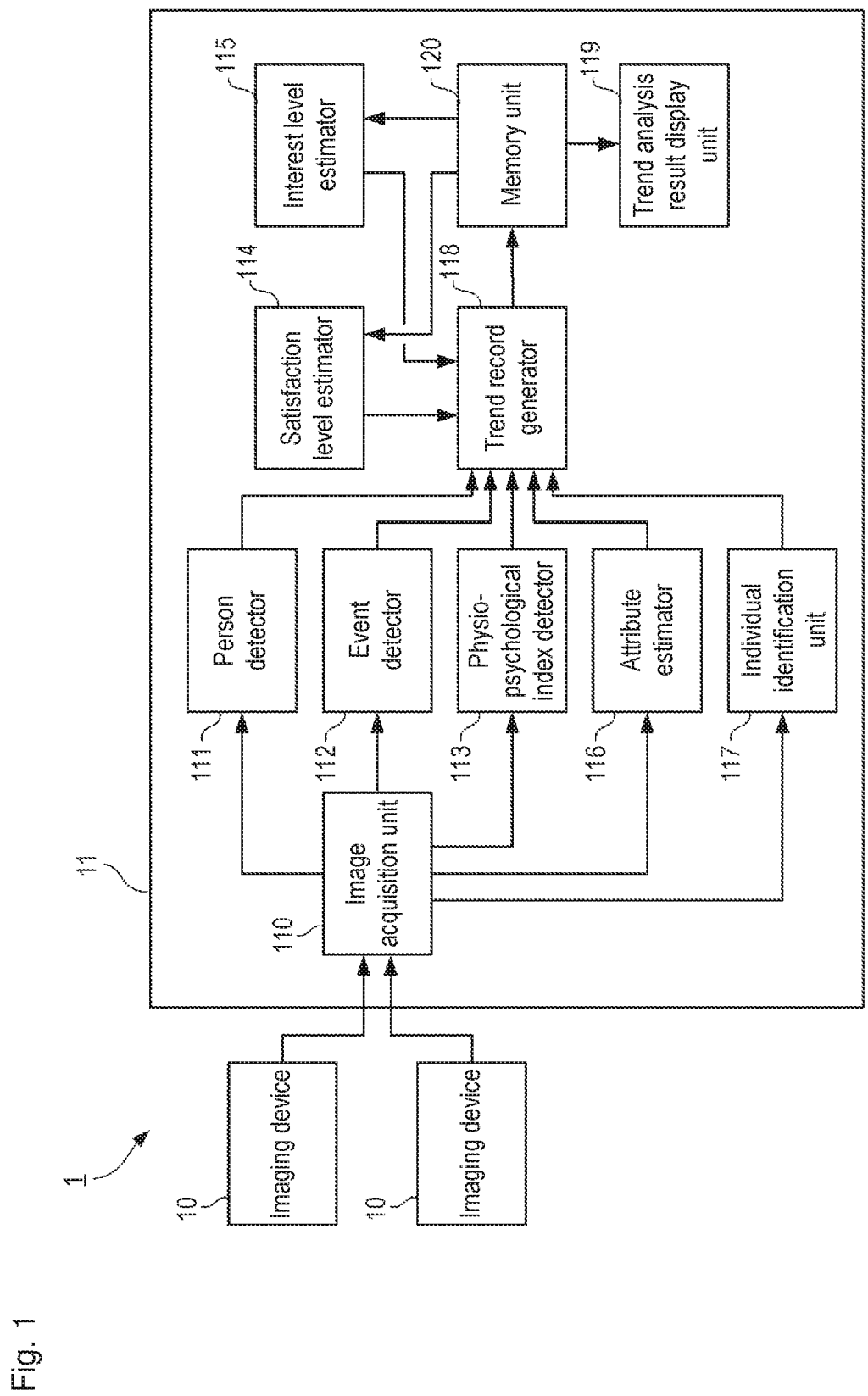
FIG. 1 is a block diagram schematically illustrating a hardware configuration and a functional configuration of a person trend recording device.
Figure 2:
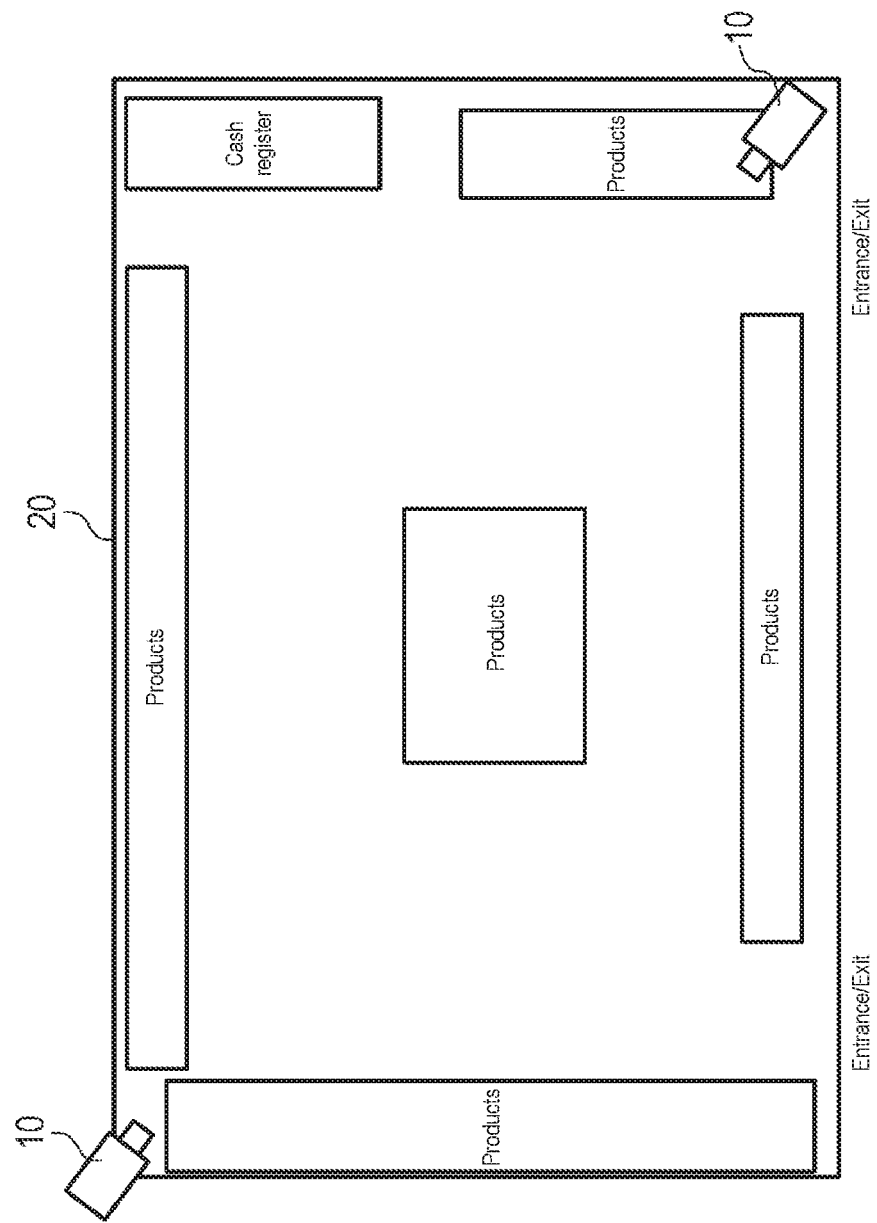
FIG. 2 is a diagram illustrating an installation example of the person trend recording device.

The configuration of a person trend recording device according to an embodiment of the present invention will be described with reference to FIGS. 1 and 2. FIG. 1 is a block diagram schematically illustrating a hardware configuration and a functional configuration of a person trend recording device 1. FIG. 2 is a diagram illustrating a store layout of a clothing store and an installation example of an imaging device 10.

The person trend recording device 1 includes, as main hardware configurations, the imaging device 10 installed in a store and an information processing device 11 that analyzes moving image data taken in from the imaging device 10 and records a customer trend. The imaging device 10 and the information processing device 11 are connected by wire or wirelessly.

The imaging device 10 is a device for capturing an image of a target area 20 in a store to fetch moving image data. The target area 20 is a range for monitoring of a customer and is set in advance based, for example, on a range in which the customer can act. As the imaging device 10, a monochrome or color camera can be used. Further, as the imaging device 10, in addition to a normal visible light camera, a special camera such as a high sensitivity (night vision) camera, an infrared camera, or thermography may be used. The imaging device 10 is installed on a ceiling, a pillar, or the like so as to overlook a target area in a store, as illustrated in FIG. 2. Two imaging devices 10 are illustrated in FIGS. 1 and 2, but the number of imaging devices 10 is freely selectable. It is preferable to design the required number and the installation position of imaging devices 10 so that the target area 20 can be photographed without a blind spot.

The information processing device 11 is a device having a function of analyzing moving image data taken in from the imaging device 10 and automatically detecting and recording trends (actions and psychological movements) of customers present in the target area 20. The information processing device 11 includes, as specific functions, an image acquisition unit 110, a person detector 111, an event detector 112, a physio-psychological index detector 113, a satisfaction level estimator 114, an interest level estimator 115, an attribute estimator 116, an individual identification unit 117, a trend record generator 118, a trend analysis result display unit 119, and a memory unit 120. The information processing device 11 according to the embodiment is made of a computer including a central processing unit (CPU) (processor), a memory, a storage (hard disc drive (HDD), solid-state drive (SSD), etc.), an input device (keyboard, mouse, touch panel, etc.), an output device (display, speaker, etc.), and communication interface, etc. Each of the functions of the information processing device 11 is realized by the CPU executing a program stored in the storage or the memory. However, the configuration of the information processing device 11 is not limited to this example. For example, distributed computing may be performed by a plurality of computers, some of the functions may be performed by a cloud server, or some the functions may be performed by a circuit such as an ASIC or an FPGA.

The image acquisition unit 110 is a function of acquiring, from the imaging device 10, moving image data obtained by capturing an image of the target area 20. The moving image data input from the image acquisition unit 110 is temporarily stored into the memory or the storage and is subjected to subsequent processing such as person detection, trend recording, and trend analysis.

The person detector 111 is a function of detecting and tracking a person, who acts in the target area 20, by analyzing the moving image data. When the person detector 111 detects an unknown person in an image of a frame in moving image data, the person detector 111 assigns a unique identifier (referred to as a person ID) to the person and stores the position and feature of the person in association with the person ID. Then, from the next frame onward, the person detector 111 searches for a person the position and feature of whom are similar, to perform tracking of the person. When a plurality of imaging devices 10 are used as in the embodiment, the adjacent relationship of the imaging area of each imaging device 10 is defined in advance, and the search range of the tracking target is expanded to the adjacent imaging area, whereby it is possible to keep tracking the person moving in the target area 20

Various algorithms have hitherto been proposed for specific methods of person detection and person tracking, and any algorithm may be used. For example, an algorithm for detecting a face or a human body can be preferably utilized with a classifier using Haar-like features or histogram of oriented gradients (HoG) features, a classifier using Deep Learning such as faster regions with convolutional neural networks (Faster R-CNN), or the like.

The event detector 112 is a function of detecting an event (matter) that occurred with the person during the period of tracking the person, by analyzing the moving image data. In the present specification, the term "event" refers to a factor that can influence the psychological state of the person. Any event may be an object to be detected so long as being detectable by image analysis. In the case of a clothing store, assumed events include "enter the store," "look at a product" "spoken to by a clerk," "pick up the product," "try on the product," "come to a bargain corner", "see the display of newly arrived products," "crowded," "bump into another person," "stand in checkout line," "pay," and "leave the store." It is assumed that what event is to be detected is set in advance in the event detector 112.

For a specific method of event detection as well, various algorithms have hitherto been proposed and any algorithm may be used. For example, the events such as "enter the store", "try on the item", "come to the bargain corner", "pay", and "leave the store", can be detected by recognizing, from the image, where the customer is in the store. The events such as "look at a product" and "see the display of newly arrived products" can be detected by recognizing, from the image, the face direction or the sight line of the customer. The events such as "spoken to by a clerk", "pick up the product", and "stand in checkout line" can be detected with an identifier that learns by Deep Learning by using teacher data of these events. The events such as "bump into another person" and "crowded" can be detected by recognizing, from the image, the number and the density of customers, the distance between customers, and the like.

The physio-psychological index detector 113 is a function of detecting a temporal change in a physio-psychological index of the person during the period of tracking the person, by analyzing the moving image data. In the embodiment, the expression of the psychological state of the person and its change as a physiological phenomenon is referred to as a physio-psychological response, and one obtained by measuring and quantifying the physio-psychological response is referred to as a physio-psychological index. Since the physio-psychological response is expressed unconsciously, it is possible to objectively grasp the true psychological state of the person and its change by observing the physio-psychological index.

Examples of the physio-psychological indices include facial expression, a smile level, a pulse rate per unit time (hereinafter simply referred to as "pulse rate"), the number of blinks per unit time (hereinafter simply referred to as "blinking frequency"), a gaze level (an index illustrating the ratio of the sight line toward a specific object), a pupil diameter, eye movement, a respiratory rate per unit time, a body temperature, sweating, blood flow, and blood pressure. One or more of these items may be used. In the embodiment, it is assumed that the following five items, which are relatively easy to detect from moving images or still images, are used: the facial expression (five classifications of pleased/serious/disgusted/sad/surprised), the smile level [%], the pulse rate [beat/min], the blinking frequency (time/min], and the gaze level [%]. Various algorithms have hitherto been proposed as detection methods for these indices, and any algorithm may be used. For example, as for the facial expression and the smile level, it is possible to use a method of performing estimation based on the shape of the face organ, the degree of opening and closing of eyes and mouth, wrinkles and the like. The pulse can be detected by capturing minute fluctuations in the Green value of the face (skin) portion. Blinks (blinking) can be detected by performing eyelid determination based on the shape of eyes, the presence or absence of black eyes, and the like. The gaze level can be calculated by estimating the sight line direction for each frame and using the probability that the sight line falls within a predetermined angle range centered on a certain object. A method for detecting the pupil diameter and eye movement from an infrared image, a method for detecting the body temperature and sweating from a thermographic image, and a method for detecting the respiratory rate, blood flow, and blood pressure from a moving image are known. It is possible to acquire physio-psychological indices using these methods.

In addition to the functions of collecting and recording the physio-psychological indices as described above, the person trend recording device 1 has a function of calculating a psychological state index in which the psychological state of the person is estimated based on temporal changes in the physio-psychological indices (this function is referred to as a psychological state estimator). In the embodiment, two estimators, a satisfaction level estimator 114 and an interest level estimator 115, are provided as the psychological state estimator.

The satisfaction level estimator 114 is a function of estimating a "satisfaction level", which is one of the psychological state indices, based on temporal changes of the physio-psychological indices. In the embodiment, a satisfaction level S(t) at time t is defined as in Formula (1), and the satisfaction level S(t) is calculated based on changes in a smile level Sm(t) and a pulse rate PR(t). However, the definition of the satisfaction level is not limited thereto but may be calculated in any way.

[Formula 1]

$$\text{Satisfaction level } S(t) = Sm(t) \times \frac{PR(t) - PR\text{min}}{PR\text{max} - PR\text{min}} \quad (1)$$

Here, Sm(t) is the smile level at time t, PR(t) is the pulse rate at time t, PRmin is the minimum value of the pulse rate in a predetermined period (which may be set to about 5 to 10 minutes, for example) including time t, and PRmax is the maximum value of the pulse rate during the same period. As in Formula (1), the value of the satisfaction level can be determined in an objective and highly reliable manner by obtaining two types of indices: an index (smile level) that can be controlled by the person and an index (pulse rate) that is difficult to control consciously.

The interest level estimator 115 is a function of estimating the "interest level" for an object in the target area 20 based on temporal changes in the physio-psychological indices. The interest level is also one of the psychological state indices. In the embodiment, an interest level l(t) at time t is defined as in Formula (2), and the interest level l(t) is calculated based on changes in a gaze level At(t) and a blinking frequency BF(t). However, the definition of the interest level is not limited thereto but may be calculated in any way.

[Formula 2]

$$\text{Interest level } I(t) = At(t) \times \frac{BF(t) - BF\text{min}}{BF\text{max} - BF\text{min}} \quad (2)$$

Here, At(t) is the gaze level at time t, BF(t) is the blinking frequency at time t, BFmin is the minimum value of the blinking frequency in a predetermined period (which may be set to about 5 to 10 minutes, for example) including time t, and BFmax is the maximum value of the blinking frequency during the same period. As illustrated in Formula (2), the value of the interest level can be determined in an objective and highly reliable manner by obtaining two types of indices: an index (gaze level) that can be controlled by the person and an index (blinking frequency) that is difficult to control consciously.

The attribute estimator 116 is a function of estimating the attribute of the person by analyzing moving image data. In the embodiment, as attributes, three items are estimated which are the age (before 10/10 to $^{20}/_{20}$ to $^{30}/_{30}$ to 40/after 40), the gender (male/female), and the body type (thin/normal/fat). For a specific method of attribute estimation as well, various algorithms have hitherto been proposed and any algorithm may be used.

The individual identification unit 117 is a function of individually identifying a person detected from an image and acquiring unique information on the person. Examples of a method of individual identification include a method of so-called image recognition (face recognition) and a method of specifying an individual from an ID card or the like possessed by the person, and any method may be used. Examples of the ID card include a credit card, an electronic money card, and a point card, and for example, the individual identification unit 117 can specify the person by reading the ID card presented at the time of checkout. In addition, the "unique information on the person" is the name, address, telephone number, e-mail address, age, occupation, place of work, family structure, purchase history, and the like.

The trend record generator 118 is a function of generating trend record data for each person based on the information obtained by each of the functional units 111 to 117. The generated trend record data is stored into the memory unit 120 or a cloud server (not illustrated). Details of the trend record data will be described later.

The trend analysis result display unit 119 is a function of displaying a trend analysis result on the display based on the trend record data. A display example of the trend analysis result will be described later.

(Trend Recording Processing)

Figure 3:
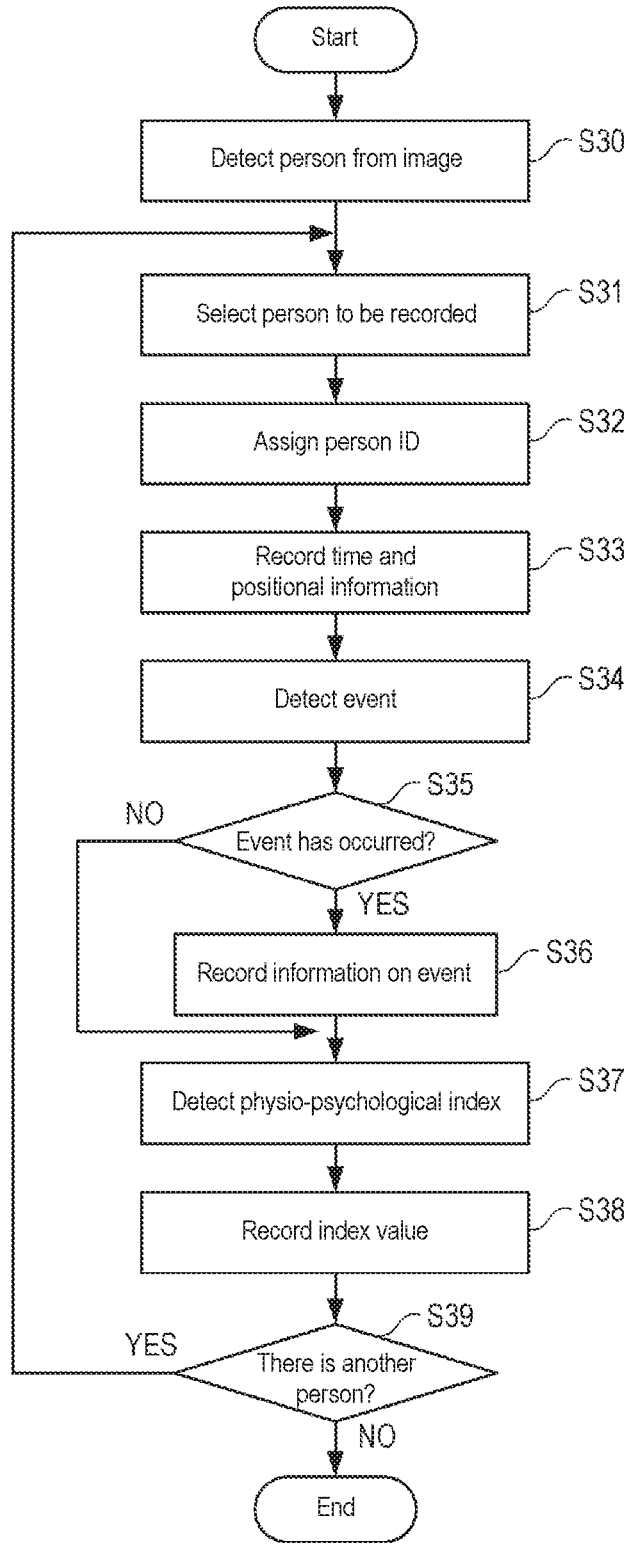
FIG. 3 is a flowchart of trend recording processing.

Next, a specific example of the trend recording processing performed by the person trend recording device 1 will be described along a flowchart of FIG. 3. The processing flow illustrated in FIG. 3 is executed on-line (in real time) and repeatedly performed every frame or every predetermined time.

First, the person detector 111 detects a person present in an image with reference to the latest frame in moving image data (step S30). In step S31, one of the detected persons is selected (here, the selected person is referred to as "person to be recorded"). The person detector 111 identifies the person to be recorded with a known person (a person who has already been detected in the past frame and is being tracked). When the person to be recorded is the person being tracked, the same person ID is assigned, and when the person to be recorded is an unknown person (a person who is detected for the first time), a new person ID is assigned (step S32). Then, the trend record generator 118 records the imaging time of the latest frame and the positional information on the person to be recorded in the trend record data on the person to be recorded (step S33).

Next, the event detector 112 detects an event that has occurred with the person to be recorded, with reference to one or more recent frames in the moving image data (step S34). When an event has occurred (step S35; YES), the trend record generator 118 records information on the detected event into the trend record data on the person to be recorded (step S36).

In addition, the physio-psychological index detector 113 refers to the latest one or more frames in the moving image data, and detects four indices, which are the facial expression, the smile level, pulse rate, the blinking frequency, and the gaze level, of the person to be recorded (step S37). The facial expression and the smile level can be detected from an image of one frame, and the pulse rate, the blinking frequency, and the gaze level can be detected from moving images of a plurality of frames. Then, the trend record generator 118 records the value of each index into the trend record data on the person to be recorded (step S38).

When the processing of each of steps S31 to S38 has been performed on all the persons detected from the image (step S39; NO), the trend recording processing is ended.

(Trend Analysis Processing)

Figure 4:
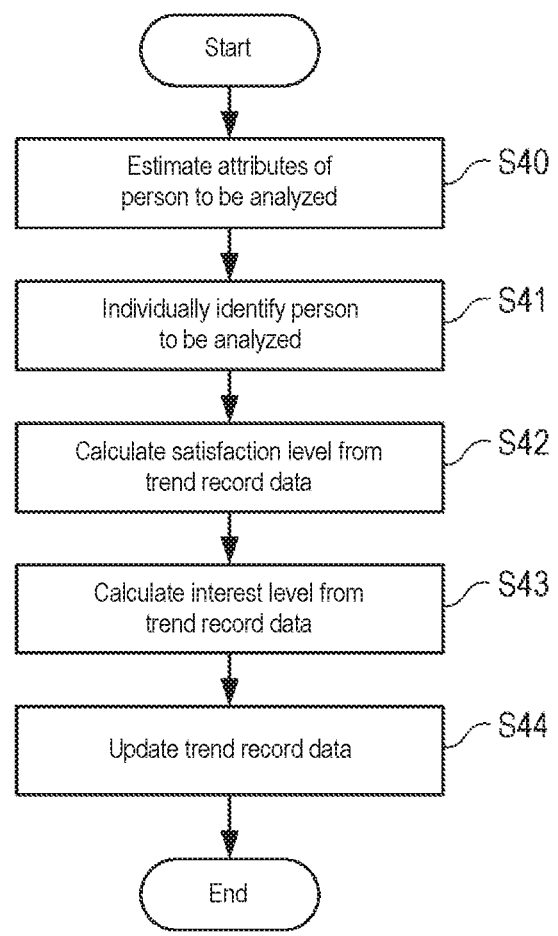
FIG. 4 is a flowchart of trend analysis processing.

Next, a specific example of the trend analysis processing performed by the person trend recording device 1 will be described while referring to the flowchart of FIG. 4. The processing flow illustrated in FIG. 4 is executed for each person off-line after a certain amount of trend record data on a certain person is accumulated, or after the tracking of the certain person is completed. Hereinafter, a person who is the target of the processing of FIG. 4 is referred to as a person to be analyzed.

In step S40, the attribute estimator 116 estimates the age, gender, and body type of the person to be analyzed, by analyzing the moving image data. Further, the individual identification unit 117 individually identifies the person to be analyzed, and when the individual identification is successful, the individual identification unit 117 acquires information (e.g., purchase history, etc.) unique to the person to be analyzed (step S41). Next, the satisfaction level estimator 114 calculates the value of the satisfaction level at each time from the trend record data on the person to be analyzed (step S42).

Figure 5:
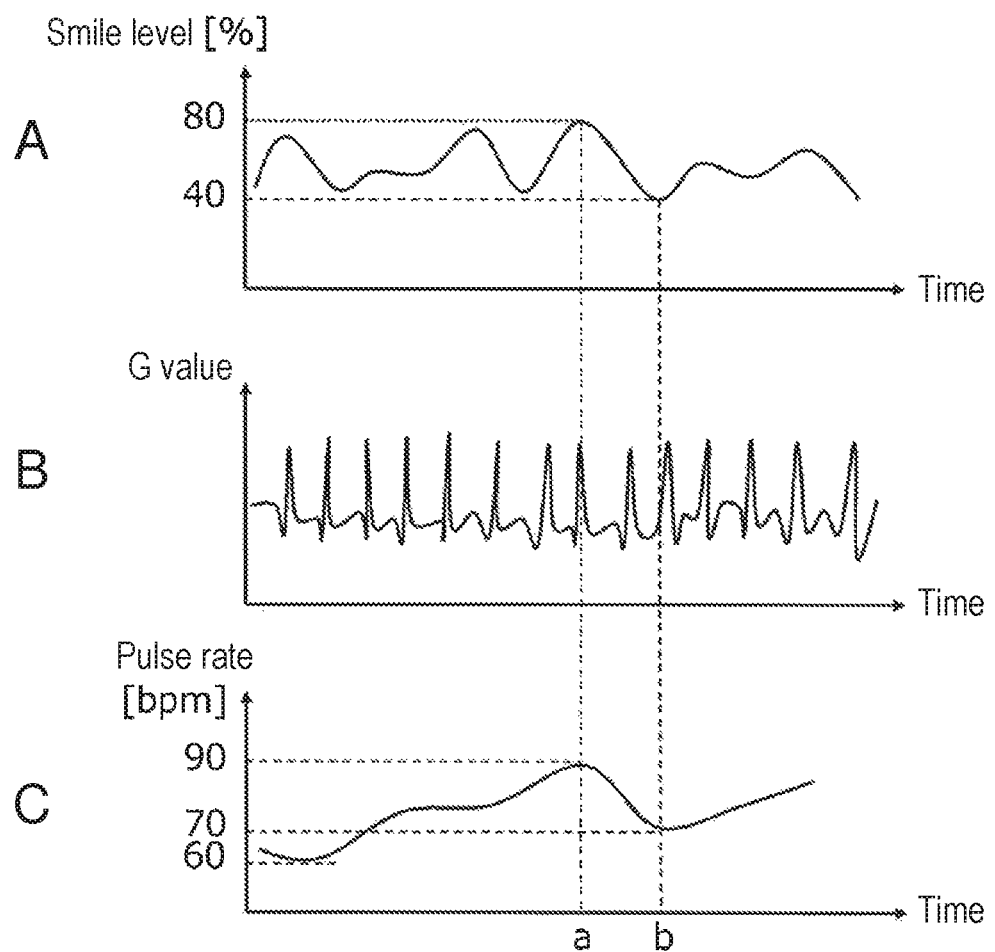
FIGS. 5A to 5C are diagrams illustrating an example of satisfaction level estimation.

FIGS. 5A to 5C illustrate examples of the satisfaction level estimation. FIG. 5A is a graph for the smile level of the person to be analyzed, where the horizontal axis represents the time [sec] and the vertical axis represents the smile level [%]. FIG. 5B is an observed waveform for the pulse wave of the person to be analyzed, where the horizontal axis represents the time [sec] and the vertical axis represents the Green value of the face portion. FIG. 5C is a graph for the pulse rate calculated from FIG. 5B, where the horizontal axis represents the time [sec] and the vertical axis represents the pulse rate [beat/min]. In this case, from Formula (1), a satisfaction level $S(a)$ at time a is obtained as: $S(a)=80\times(90-60)/(90-60)=80$ [%]. From Formula (1), a satisfaction level $S(b)$ at time b is obtained as: $S(b)=40\times(70-60)/(90-60)=13$[%].

Similarly, the interest level estimator 115 calculates the value of the interest level at each time from the trend record data on the person to be analyzed (step S43). Then, the trend record generator 118 records the information obtained in steps S40 to S43 into the trend record data on the person to be analyzed (step S44).

FIG. 6 is an example of trend record data on a person X. This is data in which the event that has occurred with the person X is temporally associated with the temporal changes in the physio-psychological indices (facial expression, smile level, pulse rate, blinking frequency, gaze level) detected from the person X. Further, in the trend record data of FIG. 6, the positional information on the person X and the temporal changes in the satisfaction level and the interest level are also associated. When such trend record data is obtained, it is possible to grasp the customer satisfaction and interest degree from tendencies of the physio-psychological indices, satisfaction level, and the attention level. Moreover, it becomes easy to estimate the event having had a good/bad influence on the customer satisfaction and interest level from the relationship between those temporal changes and the occurrence time of the event.

(Display Examples of Analysis Results)

Next, a preferred display example of the trend analysis results obtained by the trend analysis result display unit 119 will be described.

Figure 7:
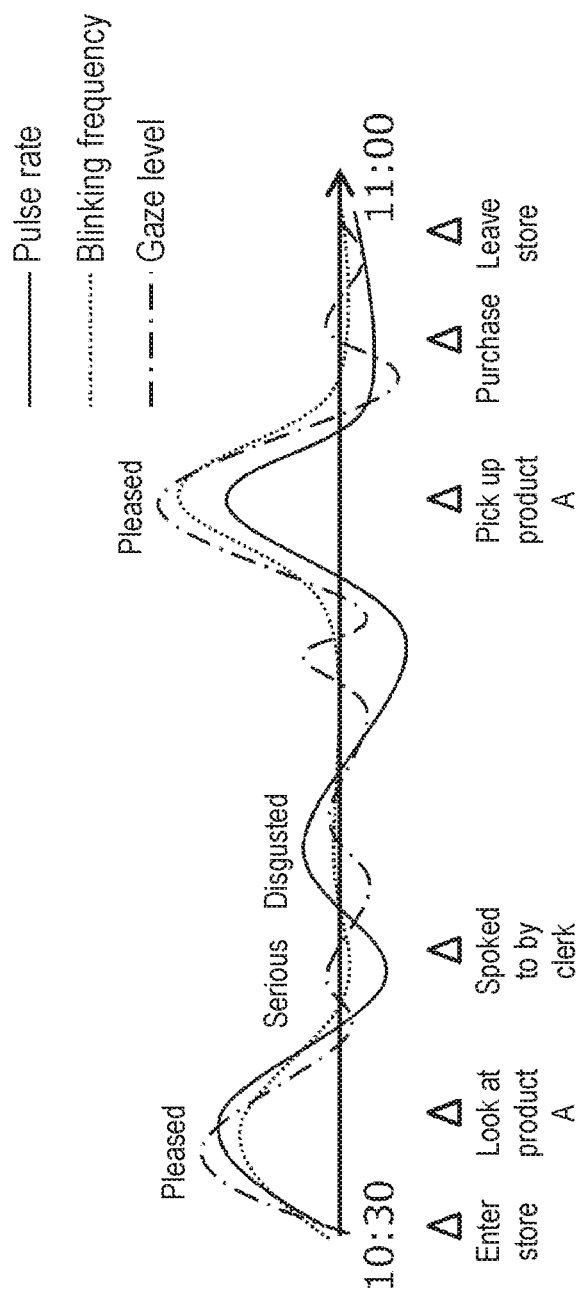
FIG. 7 is a display example of trend analysis results.
Figure 8:
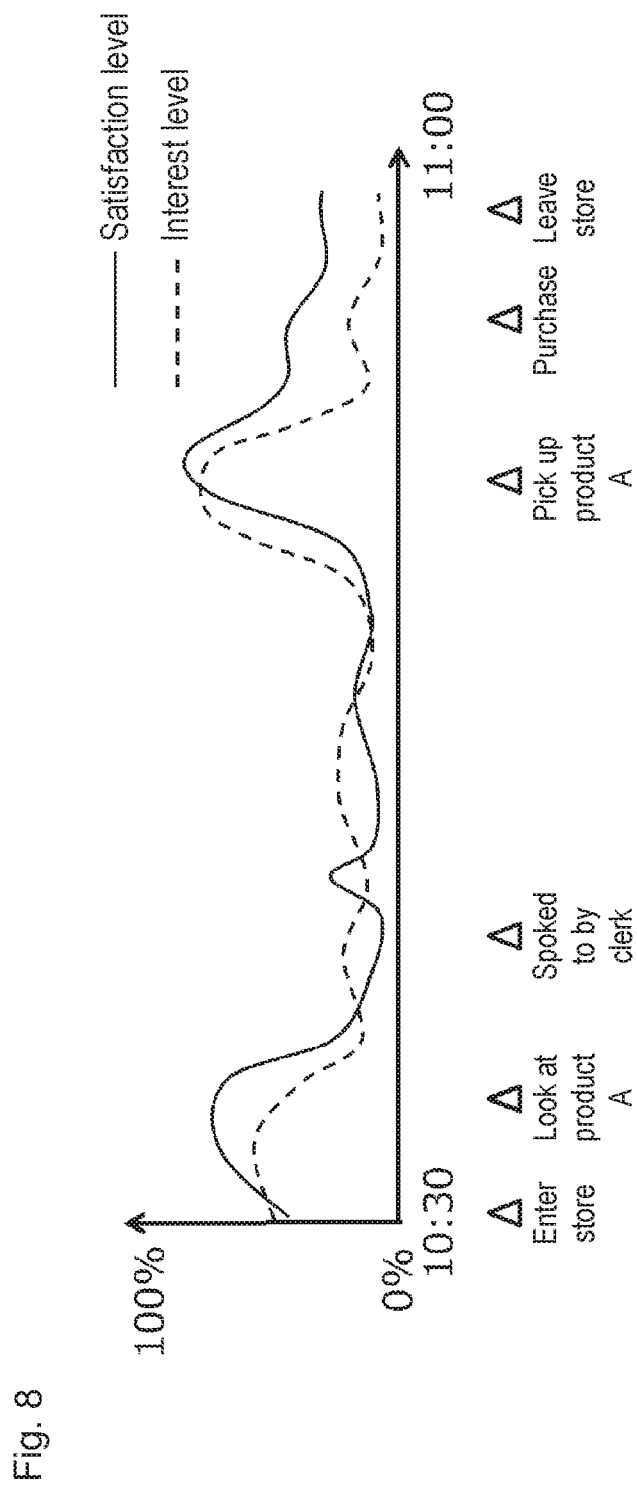
FIG. 8 is a display example of trend analysis results.

FIG. 7 is a graph in which an event that occurred during the period of tracking the person X and temporal changes in the physio-psychological indices of the person X are plotted on the same temporal axis. Further, FIG. 8 is a graph in which an event that occurred during the period of tracking the person X and temporal changes in the satisfaction level and the interest level of the person X are plotted on the same temporal axis. With these graphs, it is possible to visualize the causal relationship between actions (events) of the person X from entering to leaving the store and changes in the physio-psychological indices, the satisfaction level, and the interest level. Since it is considered that the true psychological state of the person X appears in the physio-psychological indices, the satisfaction level, and the interest level, by using the trend analysis results of FIG. 7 and FIG. 8, it is possible to evaluate, with a certain degree of reliability, the quality of the product display, the appropriateness of the customer service, and the like.

Figure 9:
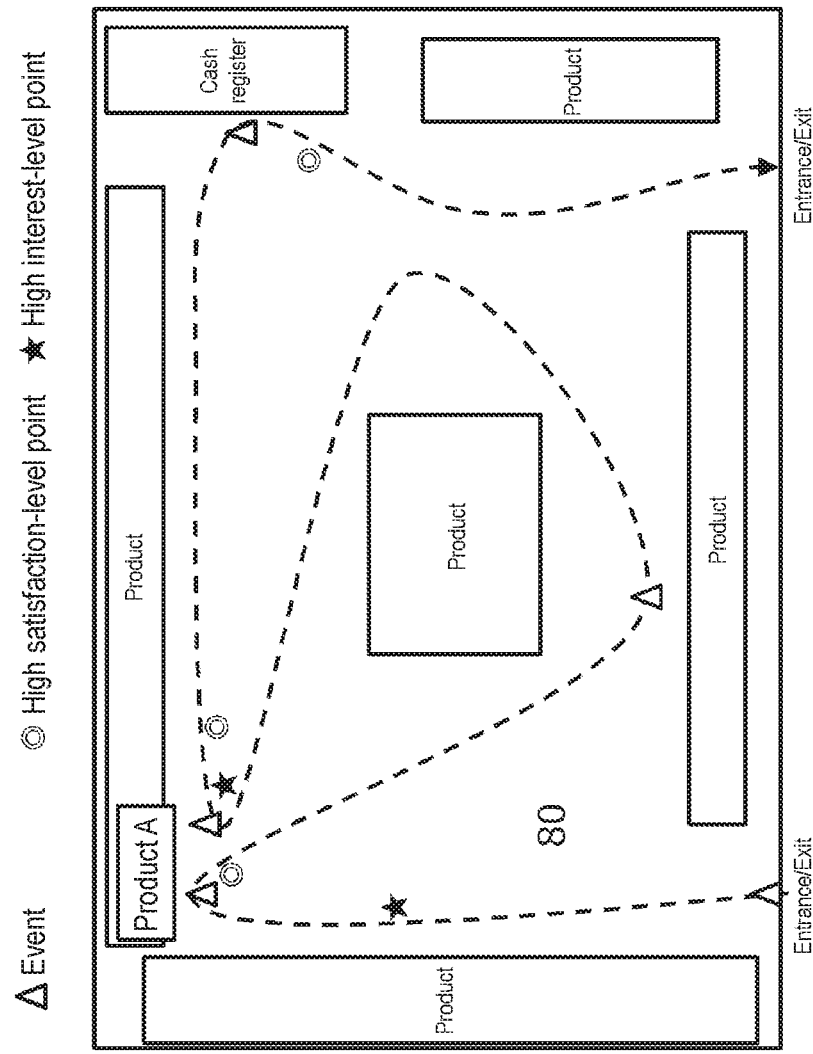
FIG. 9 is a display example of trend analysis results.

FIG. 9 illustrates an example of displaying the moving route (dotted line) of the person X, the events (white triangles) having occurred with the person X, and points (double circles, black stars) indicating high values of the satisfaction level and the interest level on the floor plan of the store. With such a floor plan display, it is possible to obtain information as to where in the store and what kind of action the person X took at the time when the satisfaction level and the interest level increased.

FIG. 10 is a display example illustrating the tendency of trend record data on the person X. The example of FIG. 10 indicates: the attributes (age, gender, body type) of the person X; the entry time, exit time, and stay time; the ratio of five facial expressions in the store; the average/maximum value of the smile level in the store; the average/maximum value/minimum value/fluctuation range of the pulse rate in the store; the average/maximum value/minimum value/fluctuation range of the blinking frequency in the store; the average/maximum value of the gaze level in the store; the average/maximum value of the satisfaction level; the average/maximum value of the interest level; and the like. By confirming such statistical data, it is possible to comprehensively grasp the trend of the person X and the tendency thereof.

Figure 11:
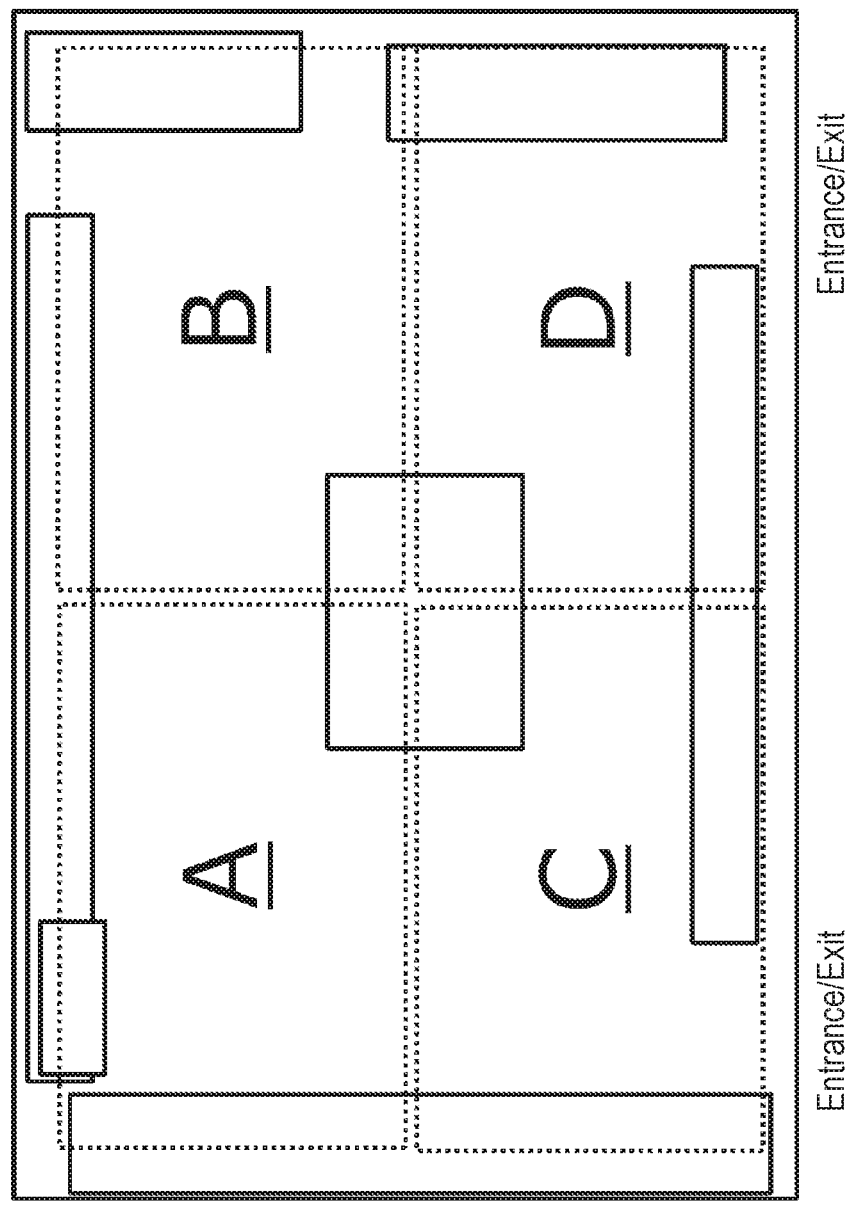
FIG. 11 illustrates an example of area division.

In each of FIGS. 7 to 10, only the trend record data on one person is displayed. However, the trend analysis result display unit 119 may calculate statistical values (average value, minimum value, maximum value, median value, etc.) of the physio-psychological indices, the satisfaction level, and the interest level from the trend record data on a plurality of persons and display the calculated values. For example, as illustrated in FIG. 11, the target area in the store may be divided into four sub-areas A to D, and as illustrated in FIG. 12, statistical values for each sub-area may be calculated and displayed. The use of the statistical analysis display as illustrated in FIG. 11 makes it possible to, for example, evaluate the popularity (customer satisfaction and interest degree) for each sub-area, perform evaluation of age group or body type, or evaluate the causal relationship between the satisfaction level and the interest level for each event.

(Advantages of the Embodiment)

According to the person trend recording device of the embodiment described above, trend record data in which an event having occurred with a certain person is temporally associated with a temporal change in a physio-psychological index of the person is generated automatically. The use of such trend record data makes it possible to objectively evaluate the customer satisfaction and interest degree from the tendency of the physio-psychological index. In addition, it becomes easy to estimate an event having exerted a good/bad influence on the customer satisfaction and the interest level from the relationship between the temporal change in the physio-psychological index and the occurrence time of the event. Furthermore, since any processing of person detection, event detection, and physio-psychological index detection is performed by moving image analysis, the trend record data can be automatically collected and recorded without imposing a physical burden or a psychological burden on the customer.

(Others)

The above description of the embodiment merely illustrates the present invention. The present invention is not limited to the above specific embodiments, but various modifications are possible within the scope of the technical idea thereof. For example, the physio-psychological indices described above are an example, and indices different from the above indices may be collected. From the viewpoint of simplification and cost reduction of the device, all pieces of information are desirably detectable from moving image data, but depending on the index, the extraction may be performed from information other than the moving image data. For example, a body temperature of a person may be measured from an image obtained by thermography.

DESCRIPTION OF SYMBOLS 1 person trend recording device
10 imaging device
11 information processing device
110 Image acquisition unit
111 person detector
112 event detector
113 physio-psychological index detector
114 satisfaction level estimator
115 interest level estimator
116 attribute estimator
117 individual identification unit
118 trend record generator
119 trend analysis result display unit
120 memory unit
20 target area

The invention claimed is:

1. A person trend recording device comprising a processor, and a memory storing a program that, when executed by the processor, causes the processor to:
operate as an image acquisition circuitry configured to acquire moving image data obtained by capturing an image of a target area;
operate as a person detector configured to detect and track a person, who acts within the target area, by analyzing the moving image data;
operate as an event detector configured to detect an event that occurs with the person during a period of tracking the person, by analyzing the moving image data;
operate as a physio-psychological index detector configured to detect a temporal change in a physio-psychological index of the person during the tracking period, by analyzing the moving image data;
operate as a satisfaction level estimator configured to estimate a satisfaction level of the person based on the temporal change in the physio-psychological index; and
operate as a trend record generator configured to generate, as trend record data on the person, data in which at least one or more events that occur with the person, the temporal change in the physio-psychological index of the person, and information on the satisfaction level estimated by the satisfaction level estimator are associated temporally,
wherein the satisfaction level estimator estimates the satisfaction level by using two types of physio-psychological indices including a physio-psychological index consciously controllable by the person, and a physio-psychological index unconsciously controllable by the person,
wherein the satisfaction level estimator estimates the satisfaction level S(t) by Formula (1), $$\text{Satisfaction level } S(t) = Sm(t) \times \frac{PR(t) - PR\text{min}}{PR\text{max} - PR\text{min}} \qquad (1)$$

where
Sm(t) is a smile level at time t,
PR(t) is a pulse rate at time t,
$PR_{min}$ is a minimum value of the pulse rate in a predetermined period including time t, and
$PR_{max}$ is a maximum value of the pulse rate in the predetermined period,
wherein the smile level is the physio-psychological index consciously controllable by the person, and the pulse rate is the physio-psychological index unconsciously controllable by the person.

2. The person trend recording device according to claim 1, wherein the program further causes the processor to operate as an interest level estimator configured to estimate an interest level of the person for an object in the target area based on the temporal change in the physio-psychological index,
wherein the trend record data further contains information on the interest level estimated by the interest level estimator, and
wherein the interest level estimator estimates the interest level by using two types of physio-psychological indices including a physio-psychological index consciously controllable by the person, and a physio-psychological index unconsciously controllable by the person.

3. The person trend recording device according to claim 1, wherein the physio-psychological indices include at least one of facial expression, a smile level, a pulse rate per unit time, a number of blinks per unit time, a gaze level, a pupil diameter, eye movement, a respiratory rate per unit time, a body temperature, sweating, blood flow, and blood pressure.

4. The person trend recording device according to claim 1, further comprising an attribute estimator configured to estimate an attribute of the person by analyzing the moving image data,
wherein the trend record data further contains information on the attribute estimated by the attribute estimator.

5. The person trend recording device according to claim 1, further comprising a trend analysis result display unit configured to display a trend analysis result based on the trend record data,
wherein the trend analysis result includes information indicating, on a temporal axis, one or more events that occur with the person during the period of tracking the person and the temporal change in physio-psychological index of the person.

6. The person trend recording device according to claim 1, further comprising a trend analysis result display unit configured to display a trend analysis result based on the trend record data,
wherein the trend analysis result includes information indicating a statistical value of the physio-psychological index and/or the satisfaction level, calculated from the trend record data on each of a plurality of persons.

7. A person trend recording device comprising a processor, and a memory storing a program that, when executed by the processor, causes the processor to:
operate as an image acquisition circuitry configured to acquire moving image data obtained by capturing an image of a target area;
operate as a person detector configured to detect and track a person, who acts within the target area, by analyzing the moving image data;
operate as an event detector configured to detect an event that occurs with the person during a period of tracking the person, by analyzing the moving image data;
operate as a physio-psychological index detector configured to detect a temporal change in a physio-psychological index of the person during the tracking period;
operate as an interest level estimator configured to estimate an interest level of the person for an object in the target area based on a temporal change in the physio-psychological index; and
operate as a trend record generator configured to generate, as trend record data on the person, data in which at least one or more events that occur with the person, the temporal change in the physio-psychological index of the person, and information on the interest level estimated by the interest level estimator are associated temporally,
wherein the interest level estimator estimates the interest level by using two types of physio-psychological indices including a physio-psychological index consciously controllable by the person, and a physio-psychological index unconsciously controllable by the person,
wherein the interest level estimator estimates the interest level l(t) by Formula (2), $$\text{Interest level } I(t) = At(t) \times \frac{BF(t) - BF\min}{BF\max - BF\min} \quad (2)$$

where
At(t) is a gaze level at time t,
BF(t) is a blinking frequency at time t,
$BF_{min}$ is a minimum value of the blinking frequency in a predetermined period including time t, and
$BF_{max}$ is a maximum value of the blinking frequency in the predetermined period,
wherein the gaze level is the physio-psychological index consciously controllable by the person, and the blinking frequency is the physio-psychological index unconsciously controllable by the person.

8. The person trend recording device according to claim 6, wherein
a plurality of sub-areas are set in the target area, and
the trend analysis result includes information indicating the statistical value calculated for each sub-area.

9. The person trend recording device according to claim 6, wherein the program further causes the processor to operate as an attribute estimator configured to estimate an attribute of the person by analyzing the moving image data, wherein
the trend record data further contains information on the attribute estimated by the attribute estimator, and
the trend analysis result includes information indicating the statistical value calculated for each of the attributes.

10. The person trend recording device according to claim 6, wherein the trend analysis result includes information indicating the statistical value calculated for each type of event.

11. A person trend recording method comprising the steps, performed by a computer, of:
acquiring a moving image data obtained by capturing an image of a target area;
detecting and tracking a person, who acts within the target area, by analyzing the moving image data;
detecting an event that occurs with the person during a period of tracking the person, by analyzing the moving image data;

detecting a temporal change in a physio-psychological index of the person during the tracking period, by analyzing the moving image data;

estimating a satisfaction level of the person based on the temporal change in the physio-psychological index; and generating, as trend record data on the person, data in which at least one or more events that occur with the person are temporally associated with the temporal change in the physio-psychological index of the person, and storing the generated data in a memory, wherein the satisfaction level is estimated by using two types of physio-psychological indices including a physio-psychological index consciously controllable by the person, and a physio-psychological index unconsciously controllable by the person, wherein the satisfaction level estimator estimates the satisfaction level S(t) by Formula (1), $$\text{Satisfaction level } S(t) = Sm(t) \times \frac{PR(t) - PR\text{min}}{PR\text{max} - PR\text{min}} \quad (1)$$

where

Sm(t) is a smile level at time t,

PR(t) is a pulse rate at time t, $PR_{min}$ is a minimum value of the pulse rate in a predetermined period including time t, and $PR_{max}$ is a maximum value of the pulse rate in the predetermined period, wherein the smile level is the physio-psychological index consciously controllable by the person, and the pulse rate is the physio-psychological index unconsciously controllable by the person.

12. The person trend recording method according to claim 11, further comprising a non-transitory computer readable medium storing a program for causing the computer to execute each of the steps.

13. A person trend recording method comprising the steps, performed by a computer, of:

acquiring a moving image data obtained by capturing an image of a target area;

detecting and tracking a person, who acts within the target area, by analyzing the moving image data;

detecting an event that occurs with the person during a period of tracking the person, by analyzing the moving image data;

detecting a temporal change in a physio-psychological index of the person during the tracking period;

estimating an interest level of the person for an object in the target area based on the temporal change in the physio-psychological index; and generating, as trend record data on the person, data in which at least one or more events that occur with the person, the temporal change in the physio-psychological index of the person, and information on the estimated interest level are associated temporally, and storing the generated data in a memory, wherein the interest level is estimated by using two types of physio-psychological indices including a physio-psychological index consciously controllable by the person, and a physio-psychological index unconsciously controllable by the person, wherein the interest level estimator estimates the interest level l(t) by Formula (2), $$\text{Interest level } I(t) = At(t) \times \frac{BF(t) - BF\text{min}}{BF\text{max} - BF\text{min}} \quad (2)$$

where

At(t) is a gaze level at time t,

BF(t) is a blinking frequency at time t, $BF_{min}$ is a minimum value of the blinking frequency in a predetermined period including time t, and $BF_{max}$ is a maximum value of the blinking frequency in the predetermined period, wherein the gaze level is the physio-psychological index consciously controllable by the person, and the blinking frequency is the physio-psychological index unconsciously controllable by the person.

14. The person trend recording method according to claim 13, further comprising a non-transitory computer readable medium storing a program for causing the computer to execute each of the steps.

15. The person trend recording device according to claim 7, further comprising a trend analysis result display unit configured to display a trend analysis result based on the trend record data, wherein the trend analysis result includes information indicating a statistical value of the physio-psychological index and/or the interest level, calculated from the trend record data on each of a plurality of persons.

* * * * *